J. SUMMERS & J. TRIMBLE.
CULTIVATORS.
No. 194,482. Patented Aug 21, 1877.
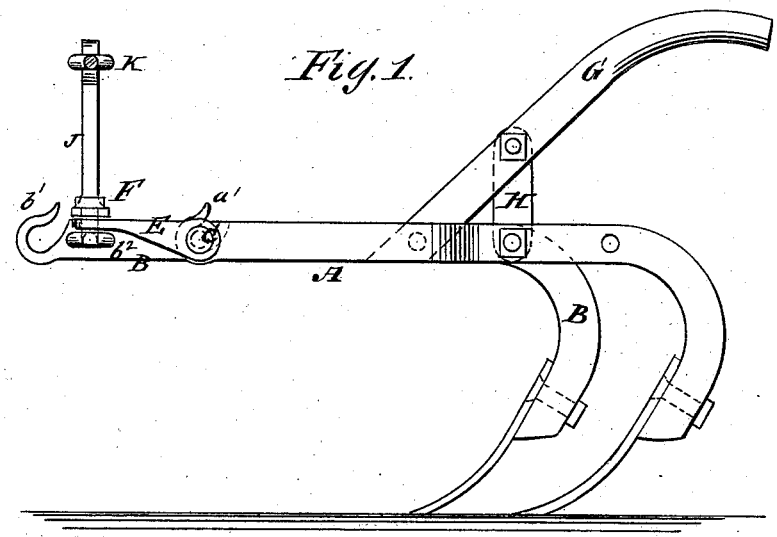
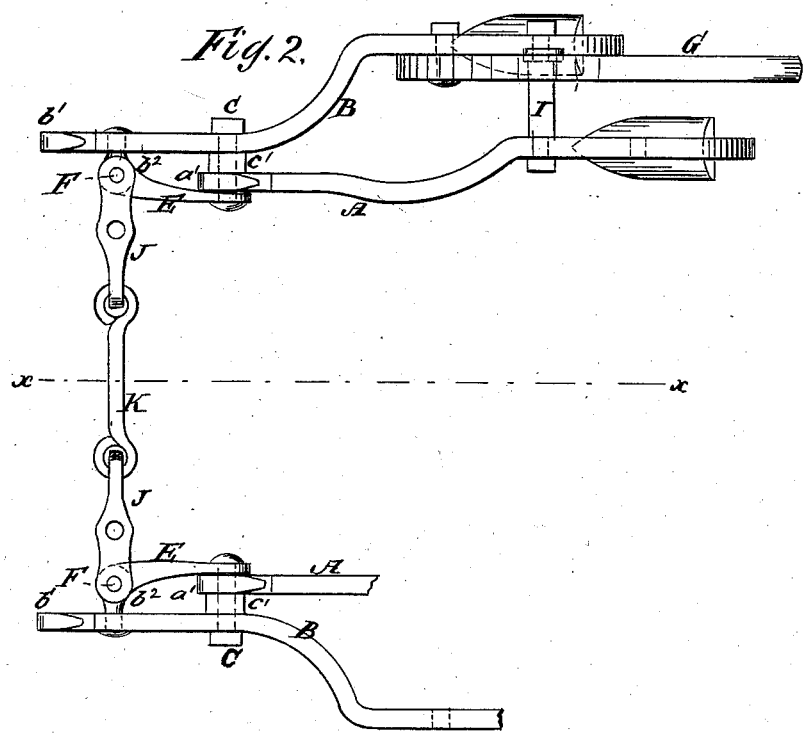
WITNESSES:
E. Wolff
J. H. Scarborough
INVENTORS
J. Summers
J. Trimble
BY
Munn
ATTORNEYS.

UNITED STATES PATENT OFFICE.

JACOB SUMMERS AND JOSEPH TRIMBLE, OF MUNCIE, INDIANA.

IMPROVEMENT IN CULTIVATORS.

Specification forming part of Letters Patent No. 194,482, dated August 21, 1877; application filed April 16, 1877.

*To all whom it may concern:*

Be it known that we, JACOB SUMMERS and JOSEPH TRIMBLE, of Muncie, in the county of Delaware and State of Indiana, have invented a new and useful Improvement in Cultivators, of which the following is a specification:

In the accompanying drawings, Figure 1 is a vertical longitudinal section of our improved cultivator taken through the line $x$ $x$, Fig. 2. Fig. 2 is a top view of the same.

Similar letters of reference indicate corresponding parts.

The object of this invention is to furnish an improved cultivator, which shall be so constructed that it may be readily adjusted for use as a two-horse or a one-horse cultivator, and that when used as a one-horse cultivator it may straddle a row of plants while the horse walks upon one side of said row.

The invention consists in the combination of the bar, the two bolts, and the eye with the forward ends of the two beams, and in the arch formed of the two adjustable bent bars and the connecting bar or link, in combination with the forward parts of the two pairs of beams, as hereinafter fully described.

Referring to the drawing, the two parts of the cultivator are exactly alike, except that the position of the beams is reversed. A is the inner beam, and B is the outer beam, of each part.

Upon the forward end of the beam B is formed a hook, $b^1$, for the application of the draft.

Upon the forward end of the beam A is formed a hook or eye, $a'$, to receive the bolt C, by which the beam A is secured to the side of the beam B, at a little distance from its forward end, a washer, $c'$, of suitable thickness being placed upon the said bolt C, between the said beams A B.

The bolt C is strengthened to receive the draft-strain by a bar, E, the rear end of which has a hole formed through it to receive the bolt C. The forward end of the bar E has a hole formed through it to receive a bolt, F, which also passes through an eye, $b^2$, attached to the forward part of the beam B at the base of the hook $b^1$.

The beams A B, at a little distance from their outer ends, are curved outwardly, and then extend to the rearward in lines parallel with their forward parts. The bend of the inner beam A is such as to bring its rear part in line with the forward part of the outer beam B; and the bend of the outer beam B is such as to bring the plows to a proper distance apart.

G are the handles, the forward ends of which are bolted to the beams A B, and which are held in position by the braces H. The upper ends of the braces H are bolted to the handles G, and their lower ends are bolted to the beams A B.

When the machine is to be used as a two-horse cultivator, one of the handles G is detached and the beams A B are connected by a bar or bolt, I.

When the machine is to be used as a two-horse cultivator the forward ends of the two pairs of beams A B A B are connected by the arch J K J. The lower parts of the bars J are horizontal, and have several holes formed through them to receive the bolts F, by which they are secured to the said pairs of beams, so that, by adjusting the bars J, the plow-beams may be adjusted farther apart or closer together, as may be desired. The bars J are bent upward at their middle parts, and their upper arms are bent inwardly, and have eyes formed in their ends to receive the ends of the connecting bar or link K.

This construction leaves the pair of plow-beams free to move to adjust themselves to uneven ground, and allows them to be readily moved in guiding them in cultivating crooked rows, and avoiding irregular hills.

Having thus described our invention, we claim as new and desire to secure by Letters Patent—

1. The combination of the bar E, the bolts C F, and the eye $b^2$, with the forward ends of the two beams A B, substantially as herein shown and described.

2. The arch, formed of the two adjustable bent bars J J, and connecting bar or link K, in combination with the forward parts of the two pairs of beams A B A B, substantially as herein shown and described.

JACOB SUMMERS.
JOSEPH TRIMBLE.

Witnesses:
GEO. H. KOONS,
CHRISTOPHER BROWN.